(12) United States Patent
Griesshammer et al.

(10) Patent No.: US 12,305,311 B2
(45) Date of Patent: May 20, 2025

(54) FIBER PREPARATION MACHINE

(71) Applicant: Maschinenfabrik Rieter AG, Winterthur (CH)

(72) Inventors: Christian Griesshammer, Berlingen (CH); Tobias Wolfer, Altnau (CH); Petr Cevona, Usti nad Orlici (CZ)

(73) Assignee: Maschinenfabrik Rieter AG, Winterthur (CH)

( * ) Notice: Subject to any disclaimer, the term of this patent is extended or adjusted under 35 U.S.C. 154(b) by 0 days.

(21) Appl. No.: 17/393,526

(22) Filed: Aug. 4, 2021

(65) Prior Publication Data

US 2022/0042212 A1    Feb. 10, 2022

(30) Foreign Application Priority Data

Aug. 5, 2020    (CH) .................................. 00974/20

(51) Int. Cl.
  *D01G 31/00*    (2006.01)
  *D01G 15/40*    (2006.01)
  *D01G 23/04*    (2006.01)

(52) U.S. Cl.
  CPC ............ *D01G 31/00* (2013.01); *D01G 23/04* (2013.01); *D01G 15/40* (2013.01)

(58) Field of Classification Search
  CPC ........ D01G 31/00; D01G 23/04; D01G 15/40; D01G 31/006; D01G 15/02; D01G 15/46; D01G 15/58; G01N 21/8915; G01N 2021/8444; G01N 33/362; D01H 13/165
  USPC ........................................................ 19/300
  See application file for complete search history.

(56) References Cited

U.S. PATENT DOCUMENTS

| | | | | |
|---|---|---|---|---|
| 5,598,266 A | * | 1/1997 | Cornuejols | D01G 31/003 250/559.46 |
| 5,692,267 A | * | 12/1997 | Leifeld | D01G 31/003 19/106 R |
| 5,761,771 A | * | 6/1998 | Leifeld | D01B 3/025 19/105 |
| 5,791,489 A | * | 8/1998 | Leifeld | D01B 3/025 209/567 |
| 6,087,608 A | * | 7/2000 | Schlichter | D01G 7/10 356/402 |

(Continued)

FOREIGN PATENT DOCUMENTS

| | | |
|---|---|---|
| CH | 396 458 A | 7/1965 |
| CH | 696 908 | 1/2008 |

(Continued)

OTHER PUBLICATIONS

Swiss Search Report, Nov. 5, 2020.
EP Search Report, Dec. 9, 2021.

*Primary Examiner* — Aiying Zhao
(74) *Attorney, Agent, or Firm* — Dority & Manning, P.A.

(57) ABSTRACT

A fiber preparation machine for processing fiber material includes a store or filling chute for storing the fiber material before or after processing. A camera is directed into an interior of the store or filling chute, the camera having an optical axis oriented at an angle ($\alpha$) with respect to a vertical axis that is perpendicular to a surface of the fiber material in a range of plus 30 degrees to minus 30 degrees. The camera has a resolution for detecting a particle having an extension of 0.1 mm2 on the surface of the fiber material.

7 Claims, 2 Drawing Sheets

(56) References Cited

U.S. PATENT DOCUMENTS

| | | | | |
|---|---|---|---|---|
| 2004/0012786 A1* | 1/2004 | Hosel | ................... | D01G 31/006 356/429 |
| 2004/0128799 A1* | 7/2004 | Hosel | ................ | G01N 21/8915 19/98 |
| 2008/0129989 A1* | 6/2008 | Engels | ................ | D01G 31/003 19/0.21 |

FOREIGN PATENT DOCUMENTS

| | | |
|---|---|---|
| CH | 696 908 A5 | 1/2008 |
| CH | 697 063 A5 | 4/2008 |
| CN | 101 979 730 | 2/2011 |
| CN | 101979730 A * | 2/2011 |
| CN | 210 458 457 U | 5/2020 |
| DE | 36 44 535 A1 | 7/1988 |
| DE | 37 34 145 A1 | 4/1989 |
| DE | 100 63 861 A1 | 6/2002 |
| DE | 102 33 011 A1 | 1/2004 |
| DE | 10 2015 118 848 A1 | 5/2017 |
| EP | 0 399 315 A1 | 11/1990 |
| EP | 0 412 447 A | 2/1991 |
| EP | 0 436 250 | 7/1991 |
| EP | 0 436 250 A1 | 7/1991 |
| EP | 0 759 483 A1 | 2/1997 |
| EP | 1 249 530 | 10/2002 |
| EP | 1 249 530 A2 | 10/2002 |
| EP | 3 473 755 A1 | 4/2019 |
| WO | WO 98/00243 A1 | 1/1998 |

\* cited by examiner

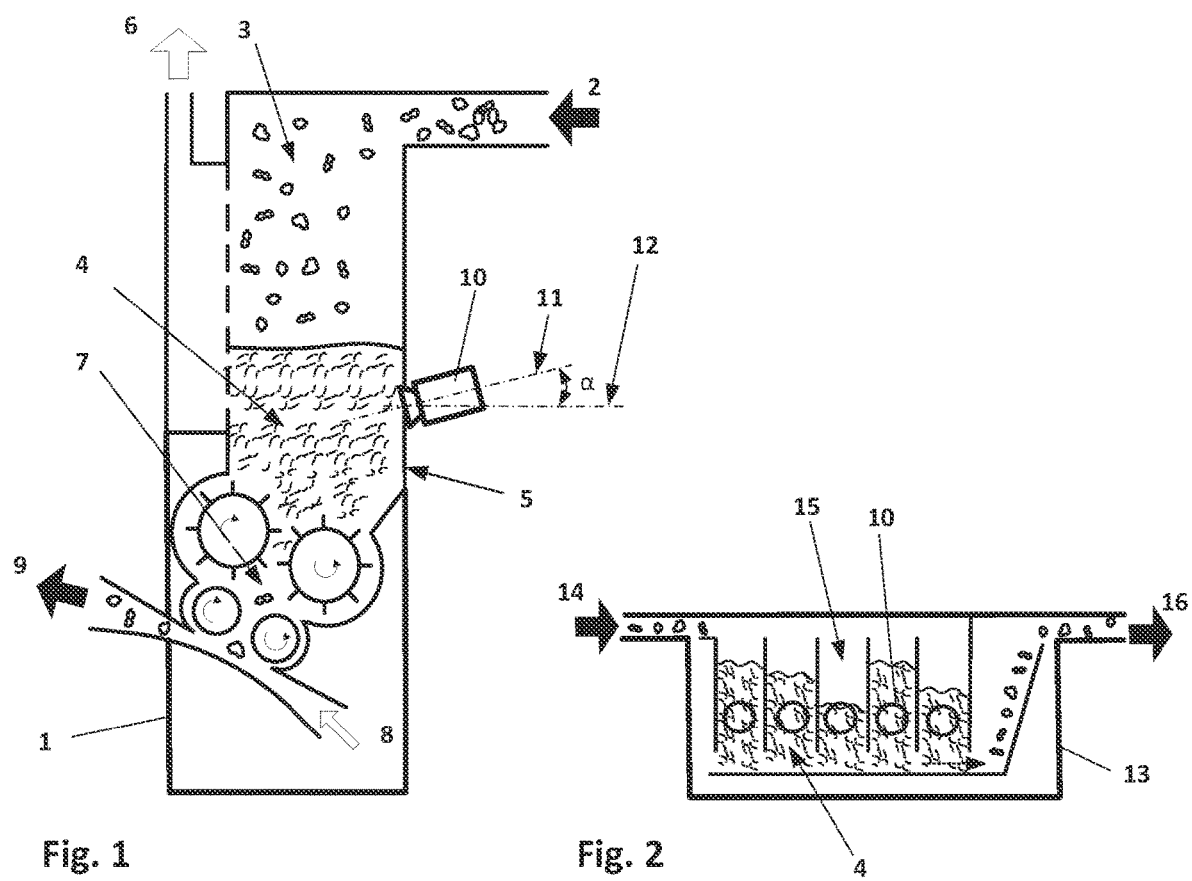
Fig. 1
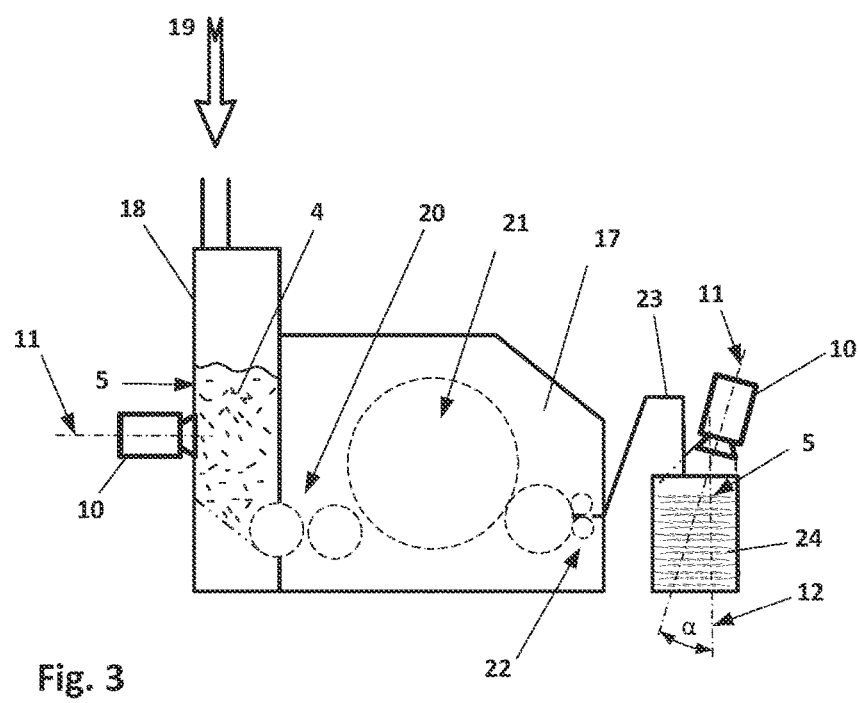
Fig. 2
Fig. 3

FIBER PREPARATION MACHINE

FIELD OF THE INVENTION

The invention relates to a novel fiber preparation machine for processing fiber material.

BACKGROUND

In a fiber preparation system in a spinning mill, supplied fiber material in the form of fibers or fiber flocks is prepared for use in a spinning machine by fiber preparation machines. In a fiber preparation system, the fibers to be prepared for spinning pass through a plurality of processing stages. In a first stage, the fibers are removed from fiber bales in the form of fiber flocks. What are referred to as bale openers are usually used for this purpose. These fiber flocks are transported out of the bale opener by means of pneumatic fiber flock conveyance and are, for example, transferred to a downstream cleaning machine. In the further stages, the fiber preparation system also has a sequence of cleaning machines through which the fibers or fiber flocks pass. The sequence and design of the cleaning machines are adapted to the fibers to be processed and are used for cleaning, mixing, and separating the fiber flocks into individual fibers and making them parallel. The individual cleaning machines in a fiber preparation system can be arranged in different ways, this being dependent, inter alia, on the raw material to be processed and the product to be obtained.

The fiber preparation machines used are, for example, coarse cleaners, fine cleaners, foreign part separators, mixers, openers and also carders, cards or draw frames. Other types of machines, such as intermediate stores, collectors or combing machines, can also be associated with the fiber preparation machines. Depending on the design of the individual fiber preparation machine, these are equipped with a storage container, a store, a collecting container or also a filling chute or mixing chamber. For the purposes of this application, a store of fiber material is also referred to as such if it consists of an accumulation of fiber material without being an actual container. For example, the fiber bales at the beginning of the process are also to be considered stores. In various processes, the fiber material finished by a fiber preparation machine is deposited in what are referred to as cans, mostly in the form of slivers. These cans are also a store for the purpose of this application.

Fiber preparation machines having a store or a chamber for stocking or storing fiber material are used to assess the condition of the fiber material. In most cases, stores are provided with viewing windows such that operating personnel can see how the fiber material behaves or what optical impression the fiber material makes on the viewer. Accordingly, the operating personnel will intervene in the ongoing process if the personal assessment indicates that this is necessary.

As a result, various proposals have been made to automate this evaluation process. The focus was primarily on the detection of substances that are not beneficial to the fiber material and are harmful to the subsequent spinning process. For example, EP 3 473 755 A1 or also DE 10 2015 118 848 A1 disclose devices for detecting foreign substances or foreign parts and removing them from a fiber material flow during the ongoing process. The fiber material is in this case guided past the light sources and corresponding sensors or cameras or transported through an inspection channel. As soon as the sensor system detects a foreign part, said part is removed from the fiber material as a result. The disadvantage of these devices is that a fiber material flow is necessary and only foreign material can be detected. A statement regarding the quality or condition of the fiber material is not possible, however, since no recording of the entire flow of fiber material takes place.

EP 0 412 447 A also discloses a device for detecting foreign substances in fiber bales that are supplied to a bale opener. In this case, the surface of the fiber bales is scanned to determine foreign bodies in the form of foreign fibers and film residues, for example packaging residues such as jute sack residues, plastic film residues, cords or ribbons, rags or cotton waste. Another disadvantage of this device is that it is not possible to make a statement regarding the quality or condition of the fiber material, since no recording of the entirety of the fiber material takes place, and impurities are instead only searched for in a targeted manner.

In order to improve the elimination of foreign substances, DE 100 63 861 A1 and CH 697 063 A5 also disclose monitoring the discharged substances. In accordance with the monitoring, a cleaning intensity of the corresponding cleaning points is set and in this way an attempt is made to achieve an optimal cleaning process. EP 0 399 315 A1 also discloses a sensor that monitors the proportion of dirt in the trash, which is separated by a cleaning machine, in the collecting container thereof in order to maximize the separated proportion of dirt. The disadvantage of these devices is that they provide a detection and analysis of the substances that are to be removed from the process or are already removed, but cannot make any statement regarding the fiber material remaining in the process. Also, an action that is carried out on the basis of the provided measures only leads to consequences (optimization or improvement) in the process in the affected machine or possibly in a subsequent machine in the process sequence.

CH 696 908 A5 discloses a carder having a device for monitoring the interior of a machine casing using cameras. This is intended to allow the states and processes within the machine housing to be monitored without the machine casing having to be opened or removed. The disadvantage of the device is that the processes can only be assessed within the machine casing, but not within the machine itself.

The process of sampling is also known from the prior art. In this case, a sample of the fiber material is periodically taken at the individual fiber preparation machines and said material is examined on appropriate laboratory machines. The disadvantage of this is that this procedure is time-consuming and the results of the analysis are available with a time delay and do not reflect the current status. If the samples are not drawn exactly identically, there is an additional scattering of the results. Tests in the laboratory are very time-consuming and thus only a few samples are taken, which means that there is still a high level of uncertainty in the results.

SUMMARY OF THE INVENTION

A problem addressed by the invention is therefore to provide a device that allows the fiber material to be processed to be observed in real time, and thereby creates the basis for a possible evaluation of the fiber material which can be used to optimize the processes in the processing of the fiber material in the entire fiber preparation process. Additional objects and advantages of the invention will be set forth in part in the following description, or may be obvious from the description, or may be learned through practice of the invention.

The problems are solved by a device having the features described and claimed herein.

In order to solve the problem, a novel fiber preparation machine for processing fiber material is proposed, the fiber preparation machine having a store or filling chute for storing the fiber material before or after processing and a camera directed into the interior of the store or filling chute. Fiber preparation machines are equipped with a store or filling chute due to the processing operation. A certain amount of fiber material is stored in a store or filling chute for the machine in order to keep the state of the fiber material, for example with respect to the density thereof or a contact pressure at the outlet from the store or filling chute, constant during processing or to be able to determine said state depending on the process. Cleaning machines, intermediate stores (referred to as condensers) or mixers typically have stores. In a mixing process, the fiber material is distributed into a plurality of mixing chambers and removed from said mixing chambers again according to a certain method, which leads to thorough mixing of the fiber material. The individual mixing chambers are in this case used as stores.

Fiber preparation machines such as carders, which rely on precise and continuous metering of the fiber material, such machines are equipped with filling chutes. The filling chutes are usually filled using a pneumatic transport system. In this case, the fiber material is introduced into the filling chute with a conveying capacity that is greater than the actual consumption of the carder. The filling chute is used as a buffer. The surface of the fiber material in the filling chute is suitable for monitoring or optical recording by means of a camera.

It may also be necessary to store the fiber material between individual processing processes. For this purpose, fiber material is filled into what are referred to as cans, for example. The cans are used as storage and are used to store the intermediate product and as a means of transport in order to bring the fiber material from one processing means to the next, for example from a carder to a draw frame. Cans are also used to bring the finished fiber material from the preparation means into a spinning mill. Furthermore, at the beginning of the fiber preparation, the fiber material is held in the form of fiber bales. The fiber bales are also to be considered a store since they are of a specific and limited volume. The fiber bales are formed and bound in a baling press, such that they can be transported and stored as break bulk.

An optical axis of the camera is oriented at an angle α with respect to the vertical to a surface of the fiber material in a range of from plus 30 degrees to minus 30 degrees. The vertical to the surface of the fiber material corresponds to the perpendicular to a surface of the fiber material created by a delimitation of the store or filling chute or the force of gravity. The vertical to the surface of the fiber material can therefore be inclined in space in the case of an inclined boundary of a store, for example in the form of a funnel. The optical axis is in the center of a field of view of the camera. The size of the field of view in this case depends on a focusing and the distance between the camera and the surface of the fiber material to be optically observed. Experience has shown that an observation of the surface of the fiber material that is as perpendicular as possible provides the best conditions for a possible evaluation of the optical recordings. A surface recorded from the side shows a shadow, which can occur due to the irregular surface resulting from partially flock-like fiber material. Because of this, an optical axis of the camera which is arranged in the vertical with respect to the surface of the fiber material is particularly preferable.

The camera advantageously has a resolution which makes it possible to detect a particle having a size of 0.1 mm$^2$ on the surface of the fiber material. A particle having a size of 0.1 mm$^2$ corresponds to the size of a dust particle. The recording of a single dust particle is necessary if the individual components of the fiber material are to be cataloged. It has been shown that a good evaluation of the optical recordings can take place using this resolution. Simple CCD cameras or RGB cameras can be used as the camera type.

A light source is advantageously directed into the interior of the store or filling chute. This separate light source allows the frequency range of the light source and camera to be matched to one another, such that an optical recording of the surface of the fiber material over time under the same conditions is possible. It is also advantageous if the light source is aligned in the optical axis of the camera. As a result, the greatest possible yield of the illuminance generated by the light source is achieved.

The light source can be designed such that it can be used for different spectra, in that it has a plurality of radiation sources or can be switched by means of appropriate upstream filters. However, it has been shown that good results can be achieved using wavelengths from the entire spectrum, from ultraviolet to infrared. The illuminance of the light source is more important than the wavelength used; this illuminance should advantageously be at least 800 lux, preferably more than 1200 lux. More preferably, one or more electronic flash units are used as the light source; in this case an illuminance of more than 10,000 lux can be achieved.

The camera is advantageously arranged in the store or filling chute. As a result, a complex design can be dispensed with and a simple retrofitting of existing fiber preparation machines is possible. In an alternative embodiment, the camera is preferably arranged outside the store or filling chute. This has the advantage that the camera is easily accessible for maintenance and servicing. Work on the camera can thus also be carried out independently of the operation of the fiber preparation machines.

The camera is advantageously installed in a housing, a transparent boundary being provided between the housing and the store or filling chute. In this way, a compact design can be provided which can be used for various fiber processing machines. In addition, the housing protects the camera from dust and other environmental influences. Due to the transparent boundary, for example a pane or film, the store or filling chute remains closed and its contents are not impaired by external influences. In this case, the camera is advantageously arranged on a lateral wall of the store or filling chute such that the fiber material slowly flows past the boundary as it passes through the store or filling chute. This has the effect that a planar surface of the fiber material is available for the image acquisition and the boundary is at the same time kept clean by the fiber material flowing past.

When using the device for stores without lateral delimitations, such as fiber bales, the camera can be placed with its housing having the transparent boundary on the surface of the bale, and in this way a camera position having an angle α with respect to the vertical to a surface of the fiber material in a range of from plus 30 degrees to minus 30 degrees can be achieved. In a further development, the housing is attached to a removal element of the bale opener, which allows the surface of the fiber bales to be recorded using the camera after each passage of the removal element. This allows continuous monitoring of the condition or quality of the fiber material in the fiber bales during the entire removal process. In this case, it is also conceivable to use the knowledge acquired to optimize a removal sequence of the individual fiber bales by the removal element.

Alternatively, the camera can have an additional lens having a cleaning device or the transparent boundary is provided with a corresponding cleaning device. Cleaning devices are known from the prior art, for example a type of windshield wiper or a film moving over the boundary can be used. Cleaning by means of a periodic puff of air is also conceivable.

In a further development of the invention, the camera is connected to an image evaluation means, the image evaluation preferably being provided by means of a neural network. An image generated by the optical image acquisition is analyzed using a neural network. Neural networks are able to evaluate large amounts of unstructured data, for example images, particularly well and to find patterns in said data. A neuron is a mathematical formula that processes an input and generates an output therefrom. The values of the formula are in this case defined by the output data. Many artificial neurons work together and thus form an artificial neural network. In order for neural networks to function, they need data that they know the result of in order to learn from said data; this process is referred to as training. Existing images are manually evaluated and the result is provided to the network. The network then performs a calculation and checks whether it matches the expected result. The neural network takes an image, breaks the individual pixels down into data (for example a color value) and then uses this data in a complex formula to calculate a result that it then compares with the result of the manual evaluation. If the result of the formula and the manual evaluation match, the network has correctly recognized an image. If the result of the formula and the manual evaluation do not match, the calculation is not yet correct and training must be continued.

A neural network does not solve this calculation using knowledge, but by means of trial and error—it optimizes the individual values in the neurons until the actual result corresponds to the desired result. Thousands of parameters are usually adjusted simultaneously in many very small steps. These steps are then repeated many thousands to millions of times, and not just with one image, but with many different images. The neuron values change a little each time. At the end of this process, however, the neurons are so fit that they can distinguish good fibers from trash in images. As a result, the neural network can not only differentiate between images that it already knows and has learned to classify correctly, it can also do this with images that it has never seen before. The network has abstracted a general pattern from the training images, which it can now apply to new images.

BRIEF DESCRIPTION OF THE DRAWINGS

The invention is described below on the basis of an exemplary embodiment and explained in more detail with the drawings, in which:

FIGS. 1 to 4 are schematic views of fiber preparation machines having a device according to the invention.

DETAILED DESCRIPTION

Figure 4:
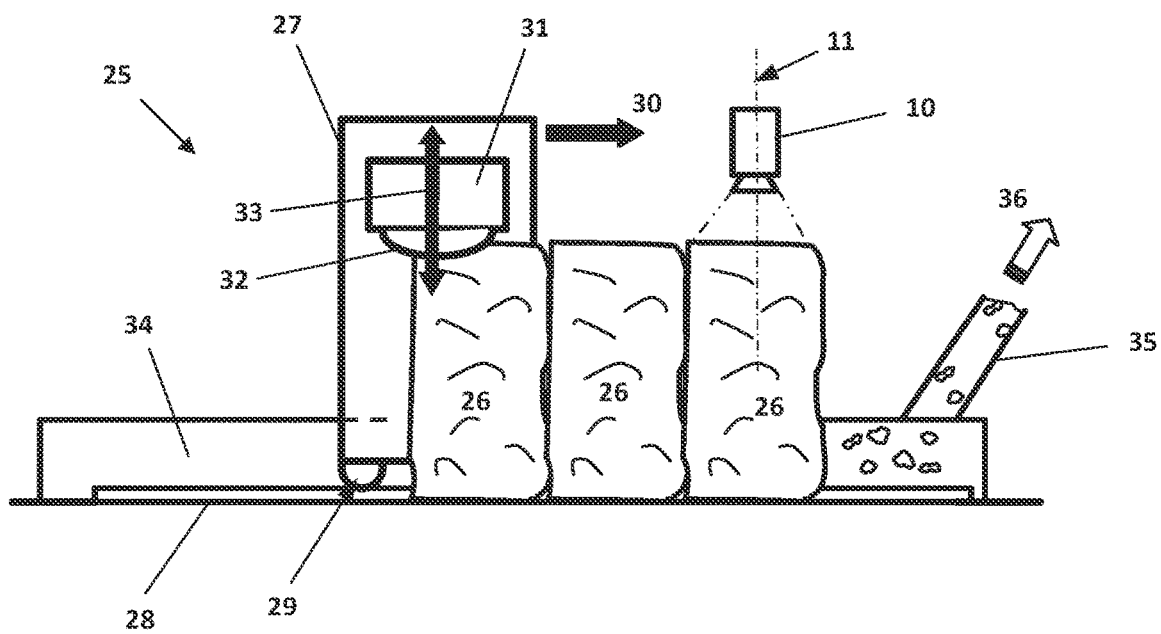

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 5:
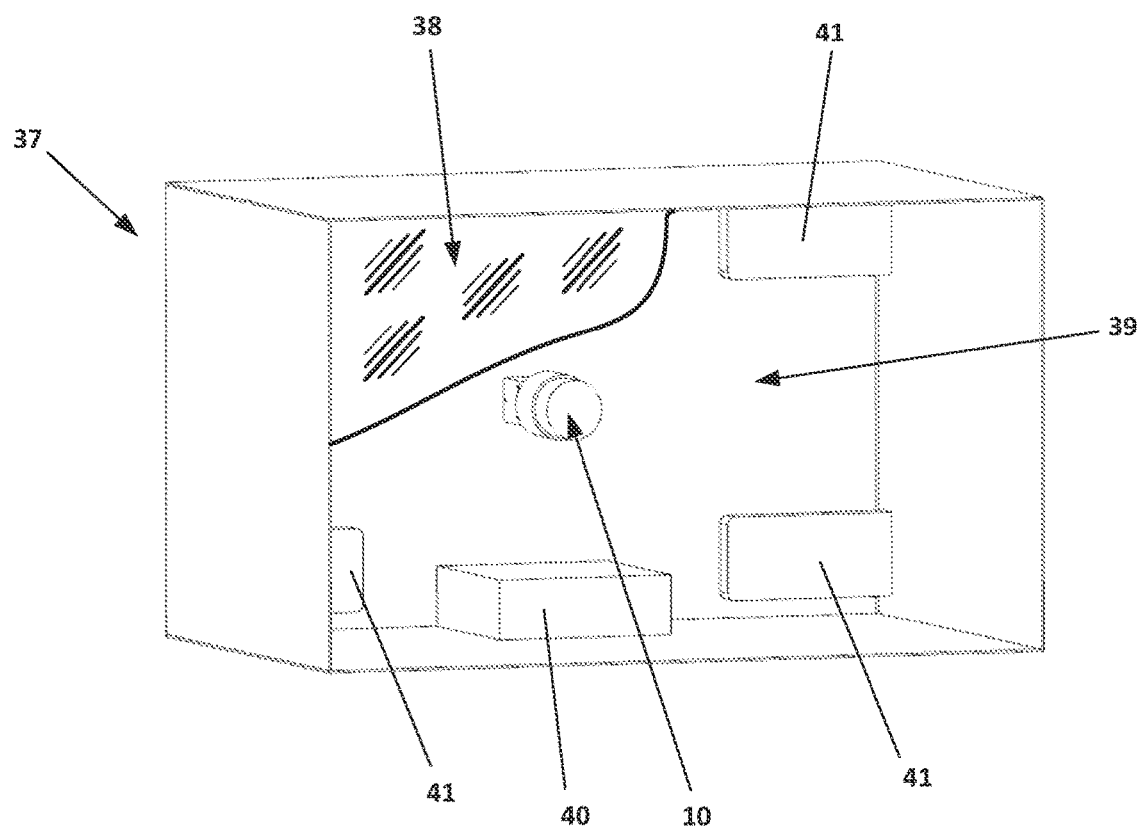
FIG. 5 is a schematic view of a camera according to the invention.

FIG. 1 is a schematic view of a cleaning machine 1 having a store 3. The fiber material 4 is introduced into the store 3 via pneumatic conveyance through the inlet 2, usually in the form of fiber flocks. In the upper region of the store 3, the fiber material 4 is separated from the transport air and the transport air is discharged from the store 3 as exhaust air 6. The fiber material 4 collects in the lower region of the store 3. The fiber material 2 is removed again from the store 3 by a metering and opening device 7 and supplied with conveying air 8 via the outlet 9 for further processing. Due to the delimitations of the store, the fiber material forms smooth lateral surfaces. A camera 10 having an optical axis 11 is provided toward a surface 5 of the fiber material 4. In the embodiment shown, the camera 10 is arranged at an angle $\alpha$ with respect to a vertical 12 (e.g. perpendicular) to the surface 5 of the fiber material, the angle $\alpha$ being less than 30 degrees. The camera 10 is shown schematically. However, an embodiment of the camera 10 as shown in FIG. 5, for example, is to be provided for use.

FIG. 2 is a schematic view of a mixer 13. In a mixer 13, the fiber material 4 passing through the inlet 14 into the mixer 13 is distributed over a plurality of mixing chambers 15 arranged behind one another. By means of a conveying means of the fiber material 4, which is provided jointly for all mixing chambers 15 and is arranged below the mixing chambers 15, the fiber material 4 removed from the various mixing chambers 15, is mixed, and fed to the outlet 16 of the mixer 13 via ascending conveyors. Cameras 10 are arranged to the side of the mixing chambers 15, the optical axis 11 of the cameras 10 being directed perpendicularly onto the surface 5 of the fiber material 4 located in the mixing chamber 15.

FIG. 3 is a schematic representation of a carder 17 having a filling chute 18. The fiber material 4 is introduced into the filling chute 18 via an inlet 19. A camera 10 is arranged to the side of the filling chute 18, the optical axis 11 of which camera 10 is directed perpendicularly onto the surface 5 of the fiber material 4 located in the filling chute 18. The fiber material 4 is then discharged from the filling chute 18 and roughly cleaned in a licker-in 20 and transferred from the licker-in 20 to a drum 21. On the circumference of the drum 21, the fiber material 4 is further cleaned and the individual fibers are parallelized. The fiber material 4 then passes via a doffer into a sliver-forming unit 22, by means of which the fibers are formed into a sliver 23. As a result, the sliver 23 leaves the carder 17 and is stored in a can 24 in a storage device. The can 24 is used as a store for the fiber material 4 leaving the carder 17 in the form of a fiber sliver 23. A camera 10 is arranged above the can 24, the optical axis 11 of which is directed onto the surface 5 of the sliver 23 located in the can 24. In the arrangement shown, a vertical 12 perpendicular to the surface 5 of the sliver 23 located in the can 24, in terms of the direction of said vertical, is identical to a vertical axis of the can 24 itself. The camera 10 is arranged with its optical axis 11 at the angle $\alpha$ with respect to the vertical 12. There is also the possibility of directing a camera 10 to cans 24 that have already been filled and removed from the storage device. In this case, it is possible to arrange the camera 10 with its optical axis 11 in the direction of the vertical axis 12.

FIG. 4 is a schematic view of a bale opener 25 and fiber bales 26 prepared for removal. The bale opener 25 has a removal tower 27 on which the fiber bale 26 can be moved along in a direction of travel 30 by means of a chassis 29 on rails 28. A removal arm 31 having a removal element 32 is attached to the removal tower 27 in such a way that the removal arm 31, together with the removal element 32, can be adjusted vertically by means of a lifting device 33. When the removal tower 27 passes over the fiber bales 26, the height of the removal arm 31 is set such that an upper layer of fiber material is removed from the fiber bales 26 by the removal element 32. The removed fiber material is collected in a collecting channel 34 that leads over the entire length of the bale opener 25 which can be driven on and is transported away from the collecting channel 34 by means of a suction conveying means (not shown). A conveying flow 36 of fiber material formed in this way is passed on to the next machine in the fiber preparation system via an outlet 35. A camera 10 is arranged above the fiber bale, the optical axis 11 of which is directed onto the surface of the fiber bale 26. In an embodiment that is not shown, the camera 10 is attached to the removal arm 31 of the bale opener 25. As a result, the camera 10 moves together with the removal tower 27 and, due to the lifting device 33 of the removal arm 31, is always at the same distance from the surface of the fiber bales 26.

FIG. 5 is a schematic view of a camera 10 according to the invention. The camera 10 is inserted into a housing 37 having a rear wall 39, an opposite front face, and lateral side walls. The camera 10 is attached to the rear wall 39 of the housing 37. The front face opposite the rear wall 39 is defined by a transparent boundary material 38 that extends to and is flush with the lateral walls. Furthermore, light sources 41 in the form of electronic flash units are arranged in the housing 37 around the camera. A control device 40 required for camera 10 and light sources 41 is also accommodated in housing 37. When the housing 37 is mounted on a store, the transparent boundary 38 material corresponds to a region of a lateral wall of the store such that the store is closed by the transparent boundary material 38 and the fiber material flowing through the store cleans the transparent boundary material.

The present invention is not limited to the embodiments shown and described. Modifications within the scope of the claims are possible, as is a combination of the features, even if these are shown and described in different embodiments.

LIST OF REFERENCE SIGNS

1 Cleaning machine
2 Inlet
3 Store
4 Fiber material
5 Surface (fiber material)
6 Exhaust air
7 Metering and opening unit
8 Conveying air
9 Fiber material flow
10 Camera
11 Camera optical axis
12 Vertical to the surface
13 Mixer
14 Mixer inlet
15 Mixing chamber
16 Mixer outlet
17 Carder
18 Filling chute
19 Carder inlet
20 Licker-in
21 Drum
22 Sliver-forming unit
23 Sliver
24 Can
25 Bale opener
26 Fiber bale
27 Removal tower
28 Rail
29 Chassis
30 Direction of travel
31 Removal arm
32 Removal element
33 Stroke
34 Collecting channel
35 Outlet
36 Conveying flow
37 Housing
38 Boundary
39 Rear wall
40 Control device
41 Light source
α Angle

The invention claimed is:

1. A fiber preparation machine for processing a fiber material, comprising:
   a store or a filling chute for storing the fiber material before or after processing;
   a camera directed into an interior of the store or the filling chute, the camera comprising an optical axis oriented at an angle (α) with respect to an axis that is perpendicular to a surface of the fiber material in a range of plus 30 degrees to minus 30 degrees;
   the camera having a resolution for detecting a particle having an extension of 0.1 mm² on the surface of the fiber material;
   a housing separate from and attachable to an outer wall surface of the store or filling chute, the housing defining an enclosed interior volume, the camera disposed within the housing;
   the housing comprising a rear wall, an opposite front face, and lateral side walls, the front face defined by a transparent boundary material that extends to and is flush with the lateral side walls, the front face defining a region of the outer wall surface of the store or filling chute such that the store or filling chute is closed by the transparent boundary material and the fiber material flowing through the store or filling chute contacts and cleans the transparent boundary material, the transparent boundary material detachable from the outer wall surface of the store or filling chute when the housing is removed from the store or filling chute;
   wherein the housing with the camera configured therein comprises a universal unit for use on different fiber preparation machines;
   a light source within the housing directed through the transparent boundary material into the interior of the store or the filling chute, the light source is aligned with the optical axis of the camera.

2. The fiber preparation machine according to claim 1, wherein the optical axis corresponds to the axis that is perpendicular to the surface of the fiber material.

3. The fiber preparation machine according to claim 1, wherein the light source has an illuminance of at least 800 lux.

4. The fiber preparation machine according to claim 1, wherein the camera is attached to the rear wall of the housing.

5. The fiber preparation machine according to claim 4, wherein the camera comprises a lens and means for cleaning the lens.

6. The fiber preparation machine according to claim 1, wherein the transparent boundary material is provided with means for cleaning the transparent boundary material.

7. The fiber preparation machine according to claim 1, further comprising an image evaluation means including a neural network for processing images from the camera.

* * * * *